April 8, 1924.  R. P. CAMPBELL  1,489,817
POWER GENERATING WINDMILL
Filed Jan. 27, 1923   3 Sheets-Sheet 1

Inventor:
Robert P. Campbell

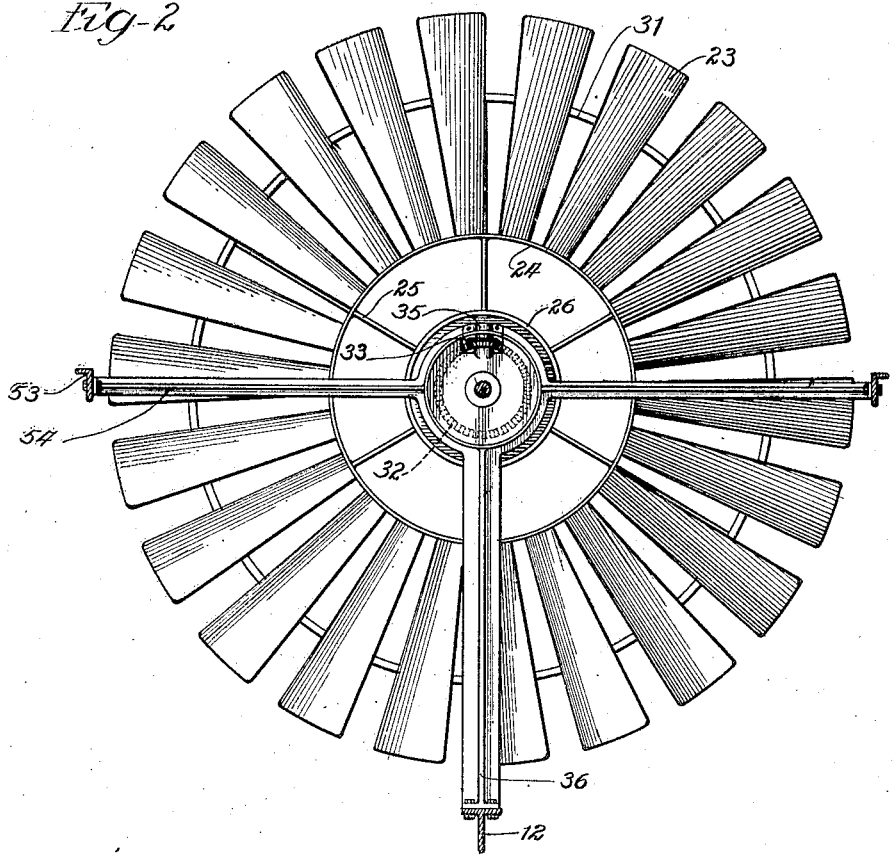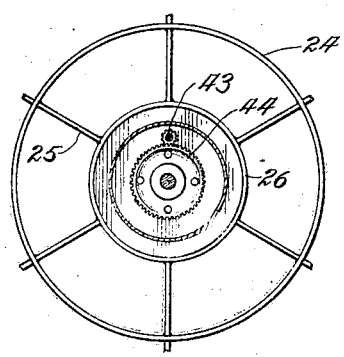

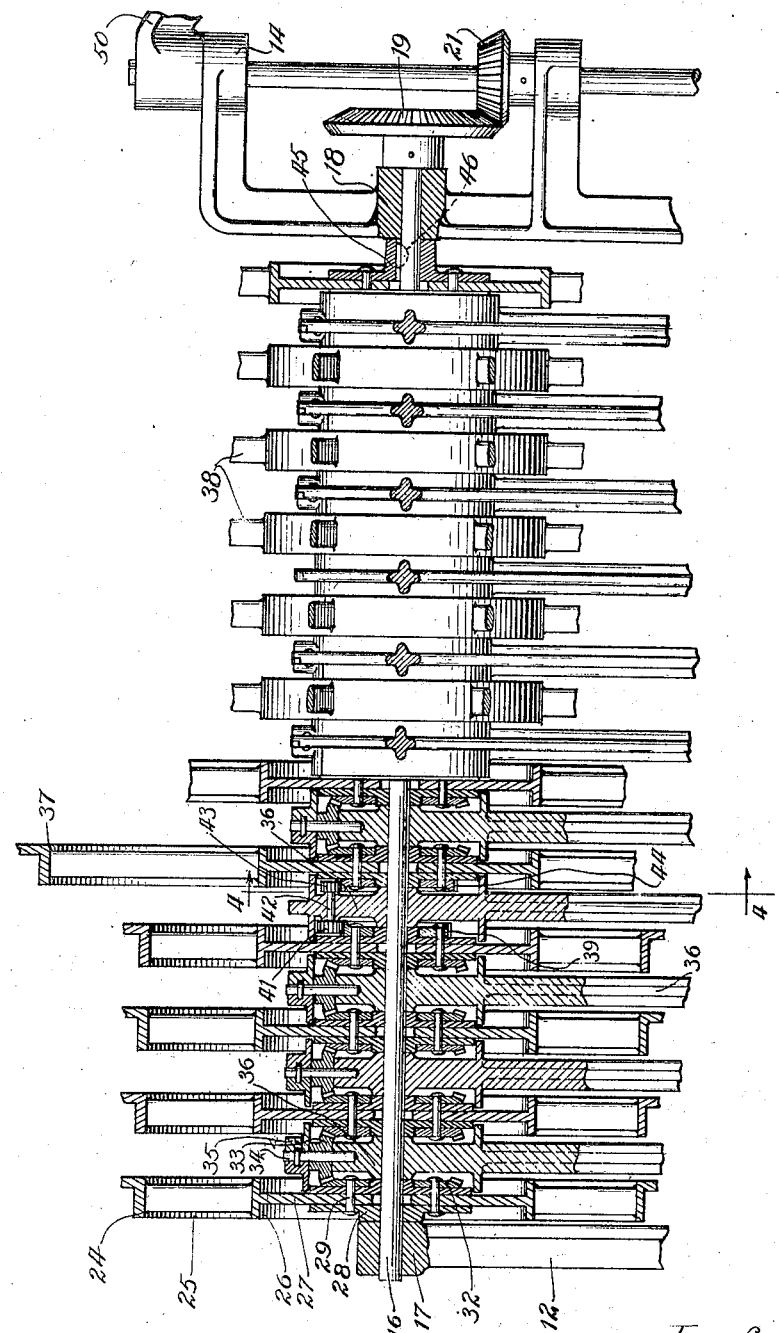

Patented Apr. 8, 1924.

1,489,817

UNITED STATES PATENT OFFICE.

ROBERT P. CAMPBELL, OF ATTICA, KANSAS.

POWER-GENERATING WINDMILL.

Application filed January 27, 1923. Serial No. 615,196.

*To all whom it may concern:*

Be it known that I, ROBERT P. CAMPBELL, a citizen of the United States, residing in Attica, in the county of Harper and State of Kansas, have invented a new and useful Improvement in Power-Generating Windmills, of which the following is a specification.

This invention relates to power generating windmills, or air motors, and has for a primary object the provision of a windmill construction in which a series of driving wheels are arranged in suitable relationship upon a single supporting shaft and the accumulated driving force, transmitted from one wheel to the other, is imparted to said shaft or to another rotating member to develop a very high power.

An important object, also, is the provision of a plurality of concentrically mounted wheels so arranged that each alternate wheel turns in the direction opposite to that of the one on the windward side of it, in conjunction with suitable differential gearing between the wheels so that the power may progressively accrue until concentrated on the shaft, or other rotating member.

A further object of the invention is the provision of an arrangement of the driving wheels in sets of different diameter whereby the wind operating the wheels of one set may be directed onto the wheels of an adjacent larger set, with consequent increase in the power of the latter, together with means for transmitting the power from one set of wheels to another with said sets rotating at different speeds.

Another object of the invention is the provision of means for mounting and controlling the position of an air motor of this character in such manner that the wheels may be suitably exposed to the wind at all times when the device is in use and may be presented at right angles to the wind when their operation is not desired.

Other objects and advantages of the invention will be apparent as it is better understood from the following description, which, taken in connection with the accompanying drawings, discloses a preferred embodiment thereof.

Referring to the drawings,

Fig. 2 is a transverse section taken substantially on the line 2—2 in Fig. 1 and showing, in side elevation, one of the driving wheels;

Fig. 3 is an enlarged view, partially in longitudinal section and partially in elevation, of the driving wheels and associated gearing and supporting shaft; and Fig. 4 is a sectional detail, taken substantially on the line 4—4 in Fig. 3 and showing the differential gearing interposed between wheels of different diameter.

Figure 1:
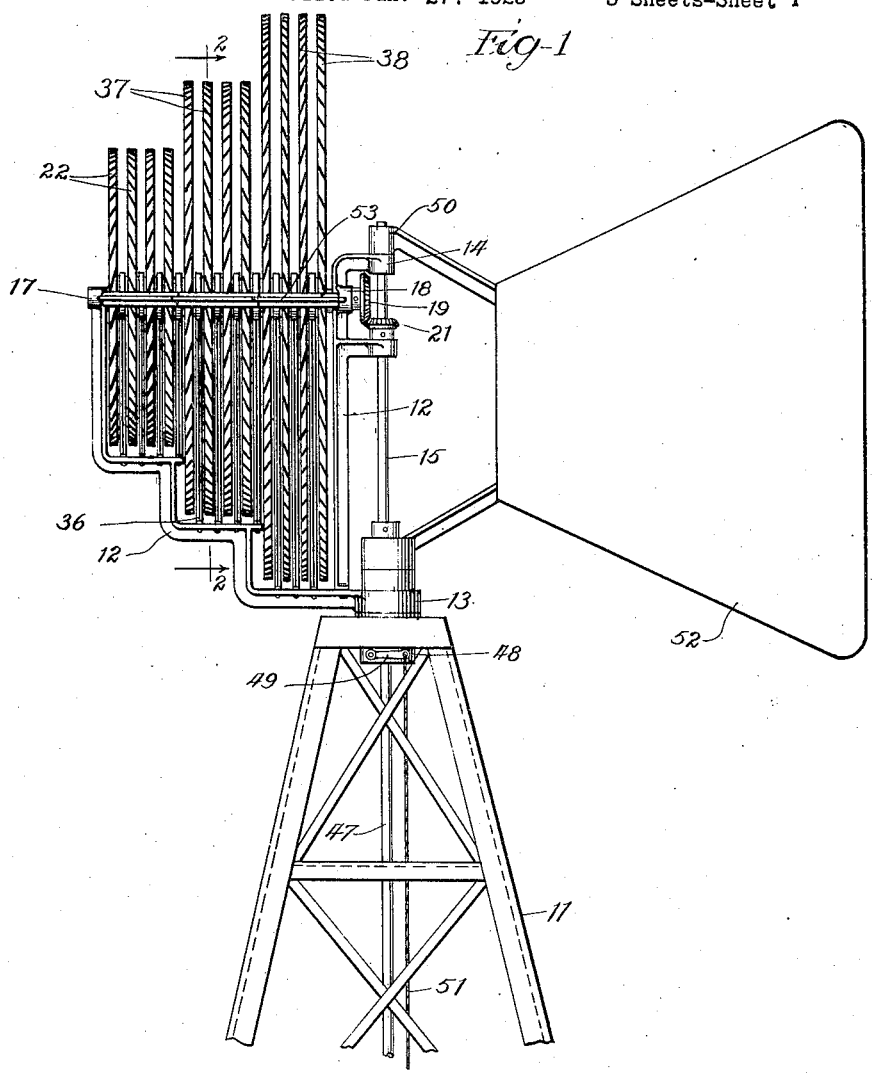
Figure 1 is a side elevation of a power generating windmill in which my invention is embodied, showing merely the upper portion of the frame.

The apparatus illustrated in the drawings comprises primarily a windmill frame 11, which may be of any usual or preferred construction having a bracket 12 mounted at the upper end of said frame and providing bearings 13 and 14 for a power transmitting shaft 15 adapted to receive power from a main power shaft 16 upon which are mounted a series of turbine driving wheels to be hereinafter described in detail.

The shaft 16 has bearings at 17 and 18 in the bracket 12 and carries at one end a bevel gear 19, meshing with a second bevel gear 21 upon the upper end of the power transmitting shaft 15. It will be obvious that said shaft 16 may be stationary, if desired, and the last wheel connected to any suitable revolving member through which the power may be communicated.

The shaft 16 is driven by means of a plurality of blade wheels arranged in sets of different diameter and for a description of these wheels, attention is directed particularly to Figs. 2 and 3 of the drawings. It will be understood that these wheels may be of any usual or preferred form, so far as general construction is concerned, and it may be noted that ordinary turbine wheels are entirely satisfactory for the purpose. The wheels which I have shown are provided with panels or blades 23 which do not extend the full radius of the wheel, but begin at a cylindrical band 24 and extend outwardly, as shown in Fig. 2. Said band 24 is connected by spokes, or spacing members, 25 with an inner hub band 26 and the latter is connected by a web part 27 with hub members 28 to which said web part is secured by bolts 29. The panels 23 are braced by an outer band 31 and they may, of course, be arranged at any desired angle to the wind to facilitate operation thereof.

The wheels of each set are geared together by means of differential gearing, comprising bevel gears 32, bolted to the hubs 28, and bevel gears 33 interposed between the wheels and engaging oppositely disposed gears 32. Said gears 33 are mounted on short vertical shafts 34 extending through upper brackets 35 and into frame parts 36, which also form bearings for the shaft 16. It will be understood that the adjacent wheels rotate in opposite directions and that the power from one wheel is transmitted to the next by the gearing just described.

The wheels of different sets are of different diameter, as heretofore stated, and it will be noted that, in the present instance, I have provided three sets, consisting of four wheels each, the wheels of the smaller set being designated by the reference character 22, those of the next set by the reference character 37, and those of the larger set by the character 38. It will be manifest that the wheels of smaller diameter rotate at a more rapid rate of speed than those of greater diameter and, for the purpose of transmitting the power from a wheel of the smaller set to the adjacent wheel of the larger set, I provide differential gearing, best illustrated in Figs. 3 and 4. Upon the hub of the smaller wheel is provided a gear 39, meshing with a pinion 41 which is mounted on a horizontal axis 42 upon which is also mounted, on the opposite side of the frame member 36, a second and smaller pinion 43. Said pinion 43 meshes with a gear 44, secured to the hub of the adjacent larger wheel, and it is to be noted that the gear 44 is of slightly larger diameter than the gear 39. This arrangement permits transmittal of the power from the smaller wheels 22 to the slower moving wheels 37 and it will be understood that a similar gearing is provided between the inner wheel 37 and the adjacent wheel 38.

By means of the foregoing construction, the power of the several wheels is accumulated and the accumulated power is imparted to the shaft 16 or other revolving member, by means of a hub member 45 secured to the innermost wheel 38 and keyed at 46 to said shaft 16. Not only is the power of the several wheels thus concentrated to drive the power shaft, but by the employment of a plurality of sets of wheels of different diameter, the force of the larger wheels is increased by the deflection of the wind from the smaller wheels thereagainst in addition to the force of the wind which initially strikes the larger wheels.

The power which it is possible to generate with an apparatus of this character may be sufficient for general farm use and it will thus be apparent that a windmill constructed as described may be employed to very great advantage upon the average farm.

As a means of controlling the position of the driving wheels with respect to the course of the wind, I provide a vane 52, which is rotatably mounted on the shaft 15 by means of a bracket 50 adapted to be connected with the frame bracket 12 by suitable clutch mechanism within a box 48, said mechanism being operated by means of an arm 49 and a rope 51 arranged in position for manual operation from the ground. It will be manifest that when the vane 52 is arranged as shown in Fig. 1, the wheels will be positioned with the wind blowing longitudinally of the shaft upon which they are mounted, but when the device is not in use, said vane 52 may be allowed to rotate so that the wheels are arranged at right angles to the course of the wind.

The bracket 12, it will be observed, is stepped at the bottom to provide a suitable support for the wheels of different diameter, and the frame parts 36 are secured to the step portions of said frame. Side frame members 53 are similarly stepped and are connected by side extensions 54 with the frame parts 36, forming a yoke at the center for supporting the structure as a unit.

It is thought that the invention and many of its attendant advantages will be understood from the foregoing description, and it will be apparent that various changes may be made in the form, construction and arrangement of the parts without departing from the spirit and scope of the invention, or sacrificing all of its material advantages, the form hereinbefore described being merely a preferred embodiment thereof.

I claim:

1. A power generating windmill, comprising a frame, a shaft mounted in said frame, means operable by the wind for moving said shaft to position with the wind blowing longitudinally thereof, a plurality of oppositely rotating panel wheels on said shaft, differential means for communicating the power from one wheel to another, and means for taking off the concentrated power of the several wheels.

2. A power generating windmill, comprising a shaft, a plurality of concentrically arranged wheels mounted on said shaft with adjacent wheels rotatable in opposite directions, means for transmitting power from one of said wheels to another, means for taking off the concentrated power of the several wheels, and means for mounting said shaft in position with the wheels exposed to the wind.

3. A power generating windmill, comprising a shaft, a plurality of concentrically arranged wheels mounted on said shaft with adjacent wheels rotatable in opposite directions, means comprising differential gearing for transmitting power from one of said wheels to another, means for taking off the concentrated power of the several wheels, and means for mounting said shaft in position with the wheels exposed to the wind.

4. A power generating windmill, comprising a shaft, a plurality of concentrically arranged wheels mounted on said shaft with adjacent wheels rotatable in opposite directions, means whereby the power of the several wheels may be accumulated, and means for mounting said shaft in position with the wheels exposed to the wind.

5. A power generating windmill, comprising a shaft, a plurality of panel wheels mounted on said shaft, means for accumulating the power generated by rotation of the several wheels, means for concentrating the accumulated power for transmission, and means for mounting said shaft in position with the wheels exposed to the wind.

6. A power generating windmill, comprising a shaft having a plurality of power wheels arranged in sets of different diameter on said shaft, adjacent wheels of each set being rotatable in opposite directions, means for transmitting the power of the wheels of one set from one to another, means for transmitting the power accumulated in one set of wheels to a wheel of the adjacent set, means for concentrating the accumulated power from all the wheels for transmission, and means for mounting said shaft in position with the wheels exposed to the wind.

7. A power generating windmill, comprising a shaft, a plurality of concentrically arranged wheels of different diameter rotatably mounted on said shaft, means for transmitting the power from one wheel to another, means for concentrating the accumulated power from all the wheels for transmission, and means for mounting said shaft in position with said wheels exposed to the wind.

8. A power generating windmill, comprising a shaft, a plurality of concentrically arranged wheels of different diameter rotatably mounted on said shaft, means for transmitting power from one wheel to another and for deflecting the wind from the smaller wheels to the larger, means for concentrating the accumulated power from all the wheels for transmission, and means for mounting said shaft in position with said wheels exposed to the wind.

9. A power generating windmill, comprising a power shaft, a plurality of turbine wheels arranged in sets of different diameter on said shaft, adjacent wheels of each set being rotatable in opposite directions, differential gearing for transmitting the power from one wheel to another of a set, reduction gearing for communicating the power from one set of wheels to another, means for mounting said shaft in position with the wheels exposed to the wind, and means for taking off the power from said shaft.

10. A power generating windmill, comprising a shaft having driving wheels of different diameter mounted thereon in position to be rotated by the wind, speed reducing gearing for transmitting the power from the wheels of one diameter to one of greater diameter, and means for concentrating the accumulated power from said wheels for transmission.

11. A power generating windmill, comprising a shaft, a plurality of sets of panel wheels arranged upon said shaft in position to be rotated by the wind, means for transmitting the power from one to another of the adjacent wheels of a set, and means for communicating the power from a wheel of one set to the adjacent larger wheel of another set, said means comprising a gear on the smaller wheel, a relatively large pinion driven by said gear, a smaller pinion mounted on the axis of said larger pinion, and a relatively large gear on said larger wheel driven by said smaller pinion.

12. A power generating windmill, comprising a shaft, a plurality of panel wheels arranged concentrically and in sets of different diameter upon said shaft, adjacent wheels of a set being rotatable by the wind in opposite directions, differential gearing between the wheels of one set for transmitting the power from one to another, speed reducing differential gearing interposed between adjacent wheels of different sets for transmitting the power from one set to another, means for concentrating the power accumulated by all of said wheels for transmission, and means for taking off said power.

ROB'T P. CAMPBELL.